US012472588B2

(12) United States Patent
Li et al.

(10) Patent No.: US 12,472,588 B2
(45) Date of Patent: Nov. 18, 2025

(54) MANUFACTURING INSULATED SPHERICAL WELD GOLD WIRE FOR INTEGRATED CIRCUIT DOUBLE-LAYER STACKED PACKAGE

(71) Applicant: Shenzhen Zhongbao New Material Technology Co., Ltd., Shenzhen (CN)

(72) Inventors: Yanqiong Li, Shenzhen (CN); Shengwei Li, Shenzhen (CN)

(73) Assignee: Shenzhen Zhongbao New Material Technology Co., Ltd., Shenzhen (CN)

(*) Notice: Subject to any disclaimer, the term of this patent is extended or adjusted under 35 U.S.C. 154(b) by 368 days.

(21) Appl. No.: 18/328,022

(22) Filed: Jun. 2, 2023

(65) Prior Publication Data

US 2023/0311251 A1 Oct. 5, 2023

Related U.S. Application Data

(63) Continuation of application No. PCT/CN2023/089202, filed on Apr. 19, 2023.

(30) Foreign Application Priority Data

Feb. 22, 2022 (CN) .......................... 202210163419.3

(51) Int. Cl.
  *B23K 35/40* (2006.01)
  *B22D 11/00* (2006.01)
  (Continued)

(52) U.S. Cl.
  CPC ............ *B23K 35/40* (2013.01); *B22D 11/001* (2013.01); *B23K 35/0272* (2013.01);
  (Continued)

(58) Field of Classification Search
  None
  See application file for complete search history.

(56) References Cited

FOREIGN PATENT DOCUMENTS

| CN | 101607360 A | 12/2009 |
|----|-------------|---------|
| CN | 105374782 A | 3/2016 |

(Continued)

OTHER PUBLICATIONS

English language machine translation of CN-111524811-A. Generated Jul. 31, 2025. (Year: 2025).*

(Continued)

*Primary Examiner* — Brian D Walck
(74) *Attorney, Agent, or Firm* — Nitin Kaushik

(57) ABSTRACT

The present invention discloses a method for manufacturing an insulated spherical weld gold wire for integrated circuit double-layer stacked package, which relates to the technical field of microelectronic packaging spherical weld gold wires, and specifically comprises the following steps: alloy sheet preparation; alloy rod preparation; stretching; annealing treatment; activation treatment; sputtered insulating coating; multi-winding and sub-packaging, since the polyaryletherketone insulating coating is provided on the surface of the spherical weld gold wire in a scaled integrated circuit and the double-layer stacked package of the present invention, the spherical weld gold wire is allowed to contact and cross during packaging, without affecting the product performance, cost and quality; two high-hardness and high-conductivity materials of cobalt and germanium are added, which greatly enhances the tensile strength of the material.

10 Claims, 3 Drawing Sheets

(51) Int. Cl.
    *B23K 35/02*           (2006.01)
    *B23K 35/36*           (2006.01)
    *C22C 1/02*            (2006.01)
    *C22C 5/02*            (2006.01)
    *C22F 1/14*            (2006.01)
    *C23C 14/12*           (2006.01)

(52) U.S. Cl.
    CPC ............ *B23K 35/3613* (2013.01); *C22C 1/02* (2013.01); *C22C 5/02* (2013.01); *C22F 1/14* (2013.01); *C23C 14/12* (2013.01)

(56) References Cited

FOREIGN PATENT DOCUMENTS

| | | | | | |
|---|---|---|---|---|---|
| CN | 111524811 A | * | 8/2020 | ............ | H01L 23/49 |
| JP | 2003027158 A | * | 1/2003 | | |

OTHER PUBLICATIONS

English language machine translation of JP-2003027158-A. Generated Jul. 31, 2025. (Year: 2025).*

* cited by examiner

MANUFACTURING INSULATED SPHERICAL WELD GOLD WIRE FOR INTEGRATED CIRCUIT DOUBLE-LAYER STACKED PACKAGE

CROSS-REFERENCE TO RELATED APPLICATIONS

The application claims priority to Chinese patent application No. 202210163419.3, filed on Feb. 22, 2022, the entire contents of which are incorporated herein by reference.

TECHNICAL FIELD

The present invention relates to the field of microelectronic package bond wire technology, in particular to a method for manufacturing an insulated spherical weld gold wire for integrated circuit double-layer stacked package.

BACKGROUND

The spherical weld gold wire is a key lead material for connecting integrated circuit or transistor chip die and lead frame. In recent years, with the rapid development of semiconductor industry, the integration of integrated circuit is increasingly higher, the circuit board is thinner and thinner, the number of electrodes on the device is increasing, the electrode spacing is narrower and narrower, and the packaging density is also smaller and smaller. The spherical weld gold wire as a lead is objectively required to have high strength, low long radian and very high arc stability and other properties. At present, the spherical weld gold wire mainly uses beryllium, cerium, silver, and other elements as the trace elements of the alloy. These trace elements have the function of refining grain and strengthening gold, but the alloy materials added with these elements are difficult to meet the high requirements of high strength and low radian of lead wire.

In recent years, the demand for smaller, more powerful microchips has driven designers and manufacturers to produce denser, more powerful devices. These densely packed devices are at electrical and physical extremes, particularly in large scale integrated circuit and dual stack integrated circuit packages, where conventional wire bonds made from bare (uninsulated) bond wires are susceptible to contact and short circuit, leading to manufacturing yield issues and hindering microchip designers to achieve further miniaturization or functionalization.

SUMMARY

An object of the present invention is to provide a method for manufacturing an insulated spherical weld gold wire for integrated circuit double-layer stacked package, which solves the following technical problems:
  these densely packed devices are at electrical and physical extremes, particularly in large scale integrated circuit and dual stack integrated circuit packages, where conventional wire bonds made from bare (uninsulated) bond wires are susceptible to contact and shorting, leading to manufacturing yield issues.
An object of the present invention can be achieved by the following technical solutions:
  a method for manufacturing an insulated spherical weld gold wire for integrated circuit double-layer stacked package, comprising the following steps:
  step S1: alloy sheet preparation: preparing a gold-cobalt alloy sheet, a gold-lanthanum alloy sheet, a gold-cerium alloy sheet and a gold-germanium alloy sheet according to weight percentages, respectively;
  step S2: alloy rod preparation: preparing a gold-cobalt-lanthanum-cerium-germanium gold alloy rod with a diameter of 8 mm from the gold-cobalt alloy sheet, gold-lanthanum alloy sheet, gold-cerium alloy sheet and gold-germanium alloy sheet prepared in step S1;
  step S3: stretching: successively subjecting the 8 mm gold-cobalt-lanthanum-cerium-germanium gold alloy rod prepared in step S2 to rough stretching, medium stretching, fine stretching, and micro-stretching to form a spherical weld gold wire with a diameter of 0.011 mm-0.050 mm;
  step S4: annealing treatment: placing the spherical weld gold wire prepared in step S3 in a continuous annealing system, using high-purity nitrogen as a protective gas, at a temperature of 300° C.-600° C. and a speed of 40 m-80 m/min to perform a continuous annealing treatment to achieve the required breaking force and elongation;
  step S5: activation treatment: placing the annealed spherical weld gold wire in a continuous activation treatment system, wherein the wire passes through an activation acid solution with a concentration of 3%-10%, wherein the solution temperature is 50° C.-120° C.; meanwhile, applying ultrasonic waves with a power of P045 and a frequency of 8 kHz-40 kHz to the solution, performing activation treatment at a speed of 40 m-80 m/min, and performing drying treatment during winding, wherein the drying temperature is 100° C.-120° C. to completely remove microscopic carbon deposits caused by high temperature residues of a lubricating liquid on the surface of the wire during annealing.
  step S6: sputtering an insulating coating: diluting the high-performance polyaryletherketone coating to a concentration of 8%-15% using acetone, and adjusting the sputtering pressure to be 0.1 MPa-0.3 MPa; passing the wire through an annular outlet with a pressure of 0.15 MPa-0.2 MPa at a speed of 100 m/min-200 m/min, performing high-performance polyaryletherketone coating sputtering on wire surface at 360 degrees at constant velocity and pressure at the annular outlet to uniformly form a protective coating, adjusting the sputtering pressure and the running speed of the wire, and controlling the thickness of the coating to be 0.3 nm-1 nm.
  step S7: sputtered insulating coating curing treatment: passing the wire after sputter coating through a U-shaped curing device with a length of 500 mm and a heating temperature of 300° C.-400° C. at a speed of 100 m/min-200 m/min to cure the high-performance polyaryletherketone coating so that the coating firmly adheres to the surface of the wire; and
  step S8: multi-winding and sub-packaging: sizing the wire treated in step S7 in a single roll, controlling tension 0.8 g-8.0 g, and sizing in a single roll of 500 or 1000.

Preferably, in step S1, the gold-cobalt alloy sheet is prepared by: placing 0.1%-0.5% cobalt and 99.9%-99.5% gold by weight percentage into a high-purity graphite crucible, respectively, and placing same in a vacuum alloy furnace, vacuumizing and heating same to 1100° C.-1300° C.; after the material is completely melted, filling high-purity argon as protection, preserving the temperature for 30 min-90 min, and pouring the alloy melt into a graphite mold to obtain a massive gold-cobalt alloy ingot; and rolling the alloy ingot into a sheet having a thickness of 0.2 mm to 0.5 mm in several passes to obtain a gold-cobalt alloy sheet.

Preferably, in step S1, the gold-lanthanum alloy sheet is prepared by: placing 0.1%-0.5% lanthanum and 99.9%-99.5% gold by weight percentage into a high-purity graphite crucible, respectively, and placing same in a vacuum alloy furnace, vacuumizing and heating same to 1100° C.-1300° C.; after the material is completely melted, filling high-purity argon as protection, preserving the temperature for 30 min-90 min, and pouring the alloy melt into a graphite mold to obtain a massive gold-lanthanum alloy ingot; and rolling the alloy ingot into a sheet having a thickness of 0.2 mm to 0.5 mm in several passes.

Preferably, in step S1, the gold-cerium alloy sheet is prepared by: placing 0.1%-0.5% cerium and 99.9%-99.5% gold by weight percentage into a high-purity graphite crucible, respectively, and placing same in a vacuum alloy furnace, vacuumizing and heating same to 1100° C.-1300° C.; after the material is completely melted, filling high-purity argon as protection, preserving the temperature for 30 min-90 min, and pouring the alloy melt into a graphite mold to obtain a massive gold-cerium alloy ingot; and rolling the alloy ingot into a sheet having a thickness of 0.2 mm to 0.5 mm in several passes.

Preferably, in step S1, the gold-germanium alloy sheet is prepared by: placing 0.1%-0.5% germanium and 99.9%-99.5% gold by weight percentage into a high-purity graphite crucible, respectively, and placing same in a vacuum alloy furnace, vacuumizing and heating to 1100° C.-1300° C.; after the material is completely melted, filling high-purity argon as protection, preserving the temperature at 30 min-90 min, and pouring the alloy melt into a graphite mold to obtain a massive gold-germanium alloy ingot; the alloy ingot was rolled in passes to a sheet having a thickness of 0.2 mm to 0.5 mm.

Preferably, in step S2, the gold-cobalt-lanthanum-cerium-germanium gold alloy rod is prepared by: placing the gold ingot with a purity of ≥99.99% and the gold-cobalt alloy sheet, the gold-lanthanum alloy sheet, the gold-cerium alloy sheet and the gold-germanium alloy sheet prepared in step S1 in a high-purity graphite crucible by weight percentage, placing same in a vacuum pull-down continuous casting furnace, vacuumizing and heating same to 1100° C.-1350° C., preserving the temperature for 15 min-60 min after the materials are completely melted, and performing electromagnetic stirring; refining same for 10 min-60 min after stirring, and obtaining a gold rod with the diameter of φ8 mm through pull-down continuous casting using a directional solidification method with a traction speed being controlled at 50 mm/min-120 mm/min.

Preferably, in step S2, the gold-cobalt-lanthanum-cerium-germanium gold alloy rod is composed of 0.0001%-1.5% of cobalt, 0.0005%-0.001% of lanthanum, 0.0005%-0.001% of cerium, and balance of gold.

Preferably, the purity of cobalt, lanthanum, cerium, germanium is ≥99.99% and the purity of said gold is ≥99.999%.

Preferably, in high-purity graphite crucibles and graphite molds, the graphite density is ≥1.65 g/cm$^3$ and the ash powder is ≤100 ppm.

Advantageous effects of the present invention are:
(1) due to the polyaryletherketone insulating coating on the surface of the spherical weld gold wire in the scaled integrated circuit and the double-layer stack package, the present invention allows the spherical weld gold wire to be contacted and crossed during packaging without affecting the product performance, cost, and quality;
(2) Compared with other resin-based insulating materials, the decomposition temperature of polyaryletherketone material is higher than that of other polyester materials such as polyurethane resin, nylon resin, polyamine resin, fluorine-group resin polyvinyl chloride resin, etc. Because the bonding temperature is generally 130° C.-200° C. during the bonding process, the above materials will be easily decomposed by temperature or carbonized when heated for bonding, thus affecting the insulating performance, especially at the time of first-solder joint FBA balling and second solder point fish plate at the bonding wire end portion, the temperature decomposition will cause solder joint pollution and lead to bonding failure. If carbonization occurs during first-solder joint FBA balling and second solder point fish plate at the bonding wire end portion, the wire bonding transportation and the terminal bonding will be interfered, and the thermal decomposition temperature of the polyaryletherketone material is 450° C. and the glass decomposition temperature is 230° C., and therefore the polyaryletherketone material will not be decomposed and carbonized by temperature.
(3) Two kinds of high hardness and high conductivity materials, cobalt, and germanium, were added, which greatly enhanced the tensile strength of the material. Under the condition of 25° C. room temperature, the breaking force of the wire with the diameter of 20 μm reached 8.2 Cn, while the breaking force of the spherical weld gold wire with the same diameter was 6.0 Cn-6.9 Cn.
(4) The addition of cobalt, lanthanum, cerium, and germanium not only enhanced the tensile strength of the material, but also greatly reduced the length of the heat-affected zone of FBA when the bonding wire was packaged, and the length of the heat-affected zone was 140 μm-240 μm when the bonding alloy wire with a diameter of 20 μm was formed. With the addition of four elements, the heat affected length was 80 μm-150 μm. With the shortening of the heat-affected zone, the arc of the bonded wire is stiff and the arc is not easy to deform, and the spherical shape is more regular.

BRIEF DESCRIPTION OF DRAWINGS

The present invention will now be further described more fully hereinafter with reference to the accompanying drawings.

DETAILED DESCRIPTION OF THE EMBODIMENTS

The embodiments of the present invention will now be described more fully hereinafter with reference to the accompanying drawings, in which embodiments of the present invention are shown. It is to be understood that the embodiments described are only a few, but not all embodiments of the present invention. Based on the embodiments of the present invention, all other embodiments obtained by a person skilled in the art without inventive effort fall within the scope of the present invention.

Embodiment 1

Figure 1:
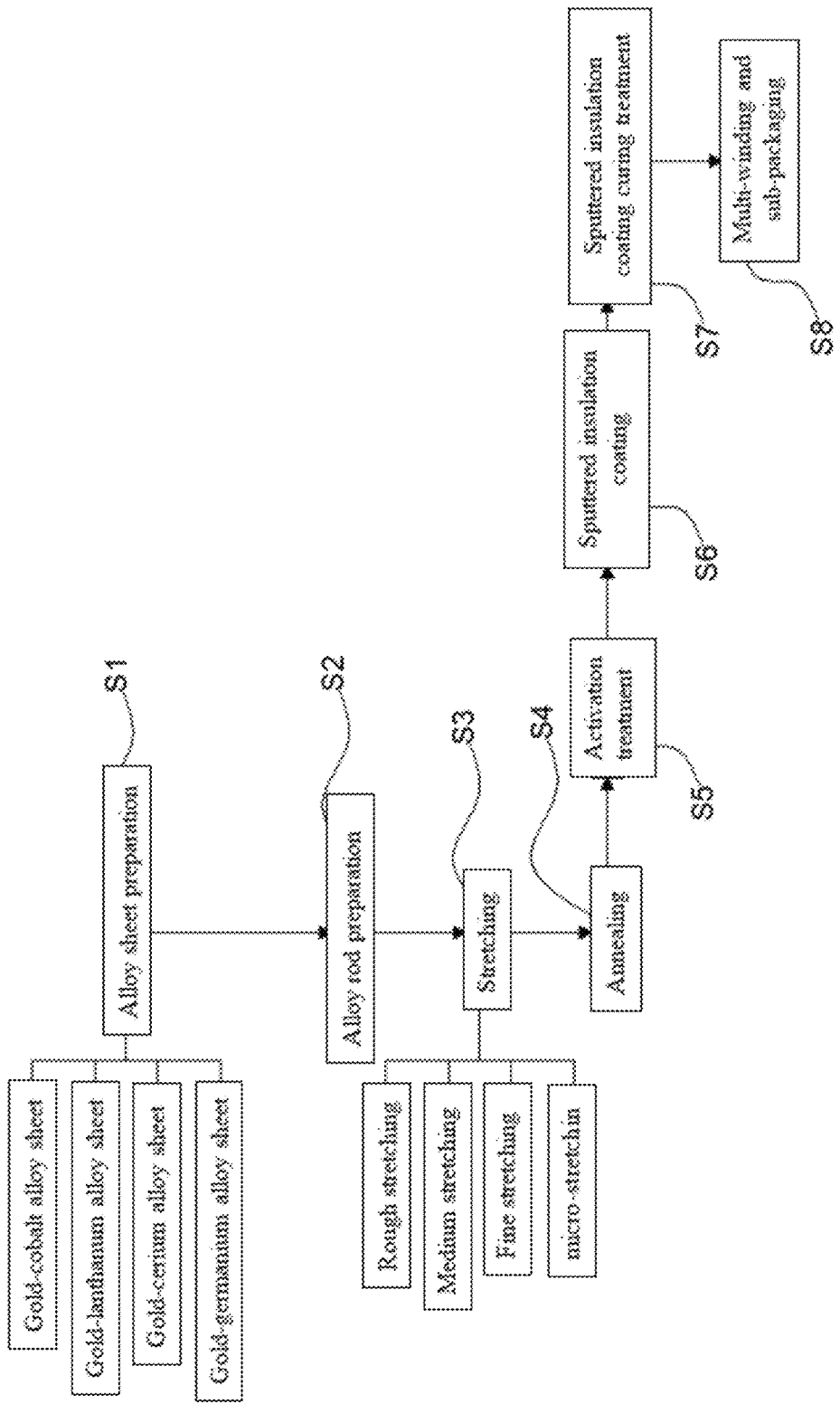
FIG. 1 is a schematic structural flow diagram of a method for manufacturing an insulated spherical weld gold wire for integrated circuit double-layer stacked package according to the present invention.

With reference to FIG. 1, the present invention is a method for manufacturing an insulated spherical weld gold wire for integrated circuit double-layer stacked package, comprising the following steps:

Step S1, Alloy Sheet Preparation:
  placing 0.1% cobalt and 99.9% gold by weight percentage into a high-purity graphite crucible, respectively, and placing same in a vacuum alloy furnace, vacuumizing and heating same to 1100° C.; after the material is completely melted, filling high-purity argon as protection, preserving the temperature for 30 min, and pouring the alloy melt into a graphite mold to obtain a massive gold-cobalt alloy ingot; and rolling the alloy ingot into a sheet having a thickness of to 0.2 mm in several passes to obtain a gold-cobalt alloy sheet;
  placing 0.1% lanthanum and 99.9% gold by weight percentage into a high-purity graphite crucible, respectively, and placing same in a vacuum alloy furnace, vacuumizing and heating same to 1100° C.; after the material is completely melted, filling high-purity argon as protection, preserving the temperature for 30 min, and pouring the alloy melt into a graphite mold to obtain a massive gold-lanthanum alloy ingot; and rolling the alloy ingot into a sheet having a thickness of to 0.2 mm in several passes;
  placing 0.1% cerium and 99.9% gold by weight percentage into a high-purity graphite crucible, respectively, and placing same in a vacuum alloy furnace, vacuumizing and heating same to 1100° C.; after the material is completely melted, filling high-purity argon as protection, preserving the temperature for 30 min, and pouring the alloy melt into a graphite mold to obtain a massive gold-cerium alloy ingot; and rolling the alloy ingot into a sheet having a thickness of to 0.2 mm in several passes; and
  placing 0.1% germanium and 99.9% gold by weight percentage into a high-purity graphite crucible, respectively, and placing same in a vacuum alloy furnace, vacuumizing and heating same to 1100° C.; after the material is completely melted, filling high-purity argon as protection, preserving the temperature for 30 min, and pouring the alloy melt into a graphite mold to obtain a massive gold-germanium alloy ingot; and rolling the alloy ingot into a sheet having a thickness of to 0.2 mm in several passes.

Step S2, Alloy Rod Preparation:
  placing the gold ingot with a purity of ≥99.99% and the gold-cobalt alloy sheet, the gold-lanthanum alloy sheet, the gold-cerium alloy sheet and the gold-germanium alloy sheet prepared in step S1 in a high-purity graphite crucible by weight percentage, placing same in a vacuum pull-down continuous casting furnace, vacuumizing and heating same to 1100° C., preserving the temperature for 15 min after the materials are completely melted, and performing electromagnetic stirring; refining same for 10 min after stirring, and obtaining a gold rod with the diameter of φ8 mm through pull-down continuous casting using a directional solidification method with a traction speed being controlled at 50 mm/min;
  wherein the composition of the gold-cobalt-lanthanum-cerium-germanium gold alloy rod is 0.0001% cobalt, 0.0005% lanthanum and 0.0005% cerium, and balance of gold;
  the purity of cobalt, lanthanum, cerium, germanium is ≥99.99% and the purity of said gold is ≥99.999%;

step S3: stretching: successively subjecting the 8 mm gold-cobalt-lanthanum-cerium-germanium gold alloy rod prepared in step S2 to rough stretching, medium stretching, fine stretching, and micro-stretching to form a spherical weld gold wire with a diameter of 0.011 mm;

step S4: annealing treatment: placing the spherical weld gold wire prepared in step S3 in a continuous annealing system, using high-purity nitrogen as a protective gas, at a temperature of 300° C. and a speed of 40 m/min to perform a continuous annealing treatment;

step S5: activation treatment: placing the annealed spherical weld gold wire in a continuous activation treatment system, wherein the wire passes through an activation acid solution with a concentration of 3%, and the solution temperature is 50° C.; meanwhile, applying ultrasonic waves with a power of P045 and a frequency of 8 kHz to the solution, and operating at a speed of 40 m to perform activation treatment, and performing drying treatment during winding, wherein the drying temperature is 100° C.;

step S6: sputtering an insulating coating: diluting the high-performance polyaryletherketone coating to a concentration of 8% using acetone, and adjusting the sputtering pressure to be 0.1 MPa; passing the wire through an annular outlet with a pressure of 0.15 Mpa at a speed of 100 m/min, performing high-performance polyaryletherketone coating sputtering on wire surface at 360 degrees at constant velocity and pressure at the annular outlet to uniformly form a protective coating, adjusting the sputtering pressure and the running speed of the wire, and controlling the thickness of the coating to be 0.3 nm, and the thickness of the protective coating to be 0.3 nm.

step S7: sputtered insulating coating curing treatment: passing the wire after sputter coating through a U-shaped curing device with a length of 500 mm and a heating temperature of 300° C. at a speed of 100 m/min to cure the high-performance polyaryletherketone coating so that the coating firmly adheres to the surface of the wire; and step S8: multi-winding and sub-packaging: sizing the wire treated in step S7 in a single roll, controlling tension 0.8 g, and sizing in a single roll of 500 or 1000;

in high-purity graphite crucibles and graphite molds, the graphite density is ≥1.65 g/cm$^3$ and the ash powder is ≤100 ppm.

Embodiment 2 a method for manufacturing an insulated spherical weld gold wire for integrated circuit double-layer stacked package, comprising the following steps:

Step S1, Alloy Sheet Preparation:
  placing 0.2% cobalt and 99.8% gold by weight percentage into a high-purity graphite crucible, respectively, and placing same in a vacuum alloy furnace, vacuumizing and heating same to 1200° C.; after the material is completely melted, filling high-purity argon as protection, preserving the temperature for 50 min, and pouring the alloy melt into a graphite mold to obtain a massive gold-cobalt alloy ingot; and rolling the alloy ingot into a sheet having a thickness of to 0.35 mm in several passes to obtain a gold-cobalt alloy sheet;

placing 0.2% lanthanum and 99.8% gold by weight percentage into a high-purity graphite crucible, respectively, and placing same in a vacuum alloy furnace, vacuumizing and heating same to 1200° C.; after the material is completely melted, filling high-purity argon as protection, preserving the temperature for 60 min, and pouring the alloy melt into a graphite mold to obtain a massive gold-lanthanum alloy ingot; and rolling the alloy ingot into a sheet having a thickness of to 0.3 mm in several passes;

placing 0.3% cerium and 99.7% gold by weight percentage into a high-purity graphite crucible, respectively, and placing same in a vacuum alloy furnace, vacuumizing and heating same to 1200° C.; after the material is completely melted, filling high-purity argon as protection, preserving the temperature for 60 min, and pouring the alloy melt into a graphite mold to obtain a massive gold-cerium alloy ingot; and rolling the alloy ingot into a sheet having a thickness of to 0.3 mm in several passes; and placing 0.2% germanium and 99.8% gold by weight percentage into a high-purity graphite crucible, respectively, and placing same in a vacuum alloy furnace, vacuumizing and heating same to 1200° C.; after the material is completely melted, filling high-purity argon as protection, preserving the temperature for 60 min, and pouring the alloy melt into a graphite mold to obtain a massive gold-germanium alloy ingot; and rolling the alloy ingot into a sheet having a thickness of to 0.3 mm in several passes.

Step S2, Alloy Rod Preparation:

placing the gold ingot with a purity of ≥99.99% and the gold-cobalt alloy sheet, the gold-lanthanum alloy sheet, the gold-cerium alloy sheet and the gold-germanium alloy sheet prepared in step S1 in a high-purity graphite crucible by weight percentage, placing same in a vacuum pull-down continuous casting furnace, vacuumizing and heating same to 1200° C., preserving the temperature for 30 min after the materials are completely melted, and performing electromagnetic stirring; refining same for 30 min after stirring, and obtaining a gold rod with the diameter of φ8 mm through pull-down continuous casting using a directional solidification method with a traction speed being controlled at 90 mm/min;

wherein the composition of the gold-cobalt-lanthanum-cerium-germanium gold alloy rod is 0.0005% cobalt, 0.0007% lanthanum and 0.0007% cerium, and balance of gold;

the purity of cobalt, lanthanum, cerium, germanium is ≥99.99% and the purity of said gold is ≥99.999%;

step S3: stretching: successively subjecting the 8 mm gold-cobalt-lanthanum-cerium-germanium gold alloy rod prepared in step S2 to rough stretching, medium stretching, fine stretching, and micro-stretching to form a spherical weld gold wire with a diameter of 0.03 mm;

step S4: annealing treatment: placing the spherical weld gold wire prepared in step S3 in a continuous annealing system, using high-purity nitrogen as a protective gas, at a temperature of 400° C. and a speed of 50 m/min to perform a continuous annealing treatment;

step S5: activation treatment: placing the annealed spherical weld gold wire in a continuous activation treatment system, wherein the wire passes through an activation acid solution with a concentration of 6%, and the solution temperature is 70° C.; meanwhile, applying ultrasonic waves with a power of P045 and a frequency of 20 KHZ to the solution, and operating at a speed of 60 m/min to perform activation treatment, and performing drying treatment during winding, wherein the drying temperature is 110° C.

step S6: sputtering an insulating coating: diluting the high-performance polyaryletherketone coating to a concentration of 10% using acetone, and adjusting the sputtering pressure to be 0.2 MPa; passing the wire through an annular outlet with a pressure of 0.018 MPa at a speed of 150 m/min, performing high-performance polyaryletherketone coating sputtering on wire surface at 360 degrees at constant velocity and pressure at the annular outlet to uniformly form a protective coating, adjusting the sputtering pressure and the running speed of the wire, and controlling the thickness of the coating to be 0.6 nm, and the thickness of the protective coating to be 0.6 nm.

step S7: sputtered insulating coating curing treatment: passing the wire after sputter coating through a U-shaped curing device with a length of 500 mm and a heating temperature of 350° C. at a speed of 150 m/min to cure the high-performance polyaryletherketone coating so that the coating firmly adheres to the surface of the wire; and step S8: multi-winding and sub-packaging: sizing the wire treated in step S7 in a single roll, controlling tension 4 g, and sizing in a single roll of 500 or 1000;

in high-purity graphite crucibles and graphite molds, the graphite density is ≥1.65 g/cm$^3$ and the ash powder is ≤100 ppm.

Embodiment 3 a method for manufacturing an insulated spherical weld gold wire for integrated circuit double-layer stacked package, comprising the following steps:

Step S1, Alloy Sheet Preparation:

placing 0.5% cobalt and 99.5% gold by weight percentage into a high-purity graphite crucible, respectively, and placing same in a vacuum alloy furnace, vacuumizing and heating same to 1300° C.; after the material is completely melted, filling high-purity argon as protection, preserving the temperature for 90 min, and pouring the alloy melt into a graphite mold to obtain a massive gold-cobalt alloy ingot; and rolling the alloy ingot into a sheet having a thickness of to 0.5 mm in several passes to obtain a gold-cobalt alloy sheet;

placing 0.5% lanthanum and 99.5% gold by weight percentage into a high-purity graphite crucible, respectively, and placing same in a vacuum alloy furnace, vacuumizing and heating same to 1300° C.; after the material is completely melted, filling high-purity argon as protection, preserving the temperature for 90 min, and pouring the alloy melt into a graphite mold to obtain a massive gold-lanthanum alloy ingot; and rolling the alloy ingot into a sheet having a thickness of to 0.5 mm in several passes;

placing 0.5% cerium and 99.5% gold by weight percentage into a high-purity graphite crucible, respectively, and placing same in a vacuum alloy furnace, vacuumizing and heating same to 1300° C.; after the material is completely melted, filling high-purity argon as protection, preserving the temperature for 90 min, and pouring the alloy melt into a graphite mold to obtain a massive gold-cerium alloy ingot; and rolling the alloy ingot into a sheet having a thickness of to 0.5 mm in several passes; and placing 0.5% germanium and 99.5% gold by weight percentage into a high-purity graphite crucible, respectively, and placing same in a vacuum alloy furnace, vacuumizing and heating same to 1300° C.; after the material is completely melted, filling high-purity argon as protection, preserving the temperature for 90 min, and pouring the alloy melt into a graphite mold to obtain a massive gold-germanium alloy ingot; and rolling the alloy ingot into a sheet having a thickness of to 0.5 mm in several passes.

Step S2, Alloy Rod Preparation:

placing the gold ingot with a purity of ≥99.99% and the gold-cobalt alloy sheet, the gold-lanthanum alloy sheet, the gold-cerium alloy sheet and the gold-germanium alloy sheet prepared in step S1 in a high-purity graphite crucible by weight percentage, placing same in a vacuum pull-down continuous casting furnace, vacuumizing and heating same to 1350° C., preserving the temperature for 60 min after the materials are completely melted, and performing electromagnetic stirring; refining same for 60 min after stirring, and obtaining a gold rod with the diameter of φ8 mm through pull-down continuous casting using a directional solidification method with a traction speed being controlled at 120 mm/min;

wherein the composition of the gold-cobalt-lanthanum-cerium-germanium gold alloy rod is 1.5% cobalt, 0.001% lanthanum and 0.001% cerium, and balance of gold;

the purity of cobalt, lanthanum, cerium, germanium is ≥99.99% and the purity of said gold is ≥99.999%;

step S3: stretching: successively subjecting the 8 mm gold-cobalt-lanthanum-cerium-germanium gold alloy rod prepared in step S2 to rough stretching, medium stretching, fine stretching, and micro-stretching to form a spherical weld gold wire with a diameter of 0.050 mm;

step S4: annealing treatment: placing the spherical weld gold wire prepared in step S3 in a continuous annealing system, using high-purity nitrogen as a protective gas, at a temperature of 600° C. and a speed of 80 m/min to perform a continuous annealing treatment;

step S5: activation treatment: placing the annealed spherical weld gold wire in a continuous activation treatment system, wherein the wire passes through an activation acid solution with a concentration of 10%, and the solution temperature is 120° C.; meanwhile, applying ultrasonic waves with a power of P045 and a frequency of 40 kHz to the solution, and operating at a speed of 80 m/min to perform activation treatment, and performing drying treatment during winding, wherein the drying temperature is 120° C.

step S6: sputtering an insulating coating: diluting the high-performance polyaryletherketone coating to a concentration of 15% using acetone, and adjusting the sputtering pressure to be 0.3 MPa; passing the wire through an annular outlet with a pressure of 0.2 MPa at a speed of 200 m/min, performing high-performance polyaryletherketone coating sputtering on wire surface at 360 degrees at constant velocity and pressure at the annular outlet to uniformly form a protective coating, adjusting the sputtering pressure and the running speed of the wire, and controlling the thickness of the coating to be 1 nm, and the thickness of the protective coating to be 1 nm;

step S7: sputtered insulating coating curing treatment: passing the wire after sputter coating through a U-shaped curing device with a length of 500 mm and a heating temperature of 400° C. at a speed of 200 m/min to cure the high-performance polyaryletherketone coating so that the coating firmly adheres to the surface of the wire; and step S8: multi-winding and sub-packaging: sizing the wire treated in step S7 in a single roll, controlling tension 8.0 g, and sizing in a single roll of 500 or 1000;

in high-purity graphite crucibles and graphite molds, the graphite density is 1.65 g/cm$^3$ and the ash powder is ≤100 ppm.

Figure 2:
FIG. 2 is a schematic view showing the structure of the dot-like distribution of the elements of the insulated spherical weld gold wire.
Figure 3:
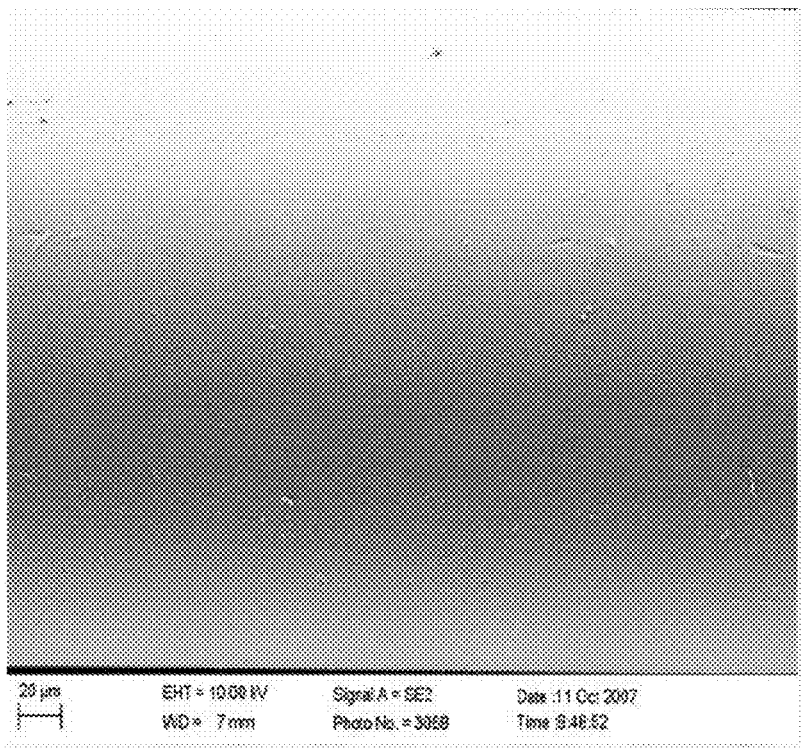
FIG. 3 is a schematic view showing the structure of the fine wire-drawn surface of the insulated spherical weld gold wire.

Referring to FIGS. 2 and 3, the spherical weld gold wire for integrated circuit double-layer stacked package obtained by the method of the present invention has a smooth solder joint surface without golf balls and strawberry balls when bonding a wire, and a vacuum directional solidification method is used to control the crystallization temperature and speed of the material, so that each of cobalt, lanthanum, cerium and germanium are distributed in a spot shape and uniformly in gold, which results in a relatively high material density, a smooth surface quality after fine wire drawing, and an excellent surface quality, and avoiding the phenomenon of burning small balls and sliding balls when bonding a wire, thereby improving the bonding smoothness.

While one embodiment of the present invention has been described in detail, the description is merely a preferred embodiment of the invention and should not be construed as limiting the scope of the invention. All changes and modifications that come within the meaning and range of equivalence of the claims are to be embraced within their scope.

What is claimed is:

1. A method for manufacturing an insulated spherical weld gold wire for integrated circuit double-layer stacked package, comprising the following steps:

step S1: alloy sheet preparation: preparing a gold-cobalt alloy sheet, a gold-lanthanum alloy sheet, a gold-cerium alloy sheet and a gold-germanium alloy sheet, wherein each alloy sheet is prepared from 0.1%-0.5% by weight of cobalt, lanthanum, cerium, or germanium, respectively, and 99.5%-99.9% by weight of gold;

step S2: alloy rod preparation: preparing a gold-cobalt-lanthanum-cerium-germanium gold alloy rod with a diameter of 8 mm from the gold-cobalt alloy sheet, gold-lanthanum alloy sheet, gold-cerium alloy sheet and gold-germanium alloy sheet prepared in step S1;

step S3: stretching the 8 mm gold-cobalt-lanthanum-cerium-germanium gold alloy rod prepared in step S2 to form a spherical weld gold wire with a diameter of 0.011 mm-0.050 mm;

step S4: annealing treatment: placing the spherical weld gold wire prepared in step S3 in a continuous annealing system, using high-purity nitrogen as a protective gas, at a temperature of 300° C.-600° C. and a speed of 40 m-80 m/min to perform a continuous annealing treatment;

step S5: activation treatment: placing the annealed spherical weld gold wire in a continuous activation treatment system, wherein the wire passes through an activation acid solution with a concentration of 3%-10%, wherein the solution temperature is 50° C.-120° C.; meanwhile, applying ultrasonic waves with a frequency of 8 kHz- 40 kHz to the solution, performing activation treatment at a speed of 40 m-80 m/min, and performing drying treatment during winding, wherein the drying temperature is 100° C.-120° C.;

step S6: sputtering an insulating coating: diluting the high-performance polyaryletherketone coating to a concentration of 8%-15% using acetone, and adjusting the sputtering pressure to be 0.1 MPa-0.3 MPa; passing the wire through an annular outlet with a pressure of 0.15 MPa-0.2 MPa at a speed of 100 m/min-200 m/min, performing high-performance polyaryletherketone coating sputtering on wire surface at 360 degrees at constant velocity and pressure at the annular outlet to uniformly form a protective coating, adjusting the sputtering pressure and the running speed of the wire, and controlling the thickness of the coating to be 0.3 nm-1 nm;

step S7: sputtered insulating coating curing treatment: passing the wire after sputter coating through a U-shaped curing device with a length of 500 mm and a heating temperature of 300° C.-400° C. at a speed of 100 m/min-200 m/min to cure the high-performance polyaryletherketone coating so that the coating firmly adheres to the surface of the wire; and step S8: multi-winding and sub-packaging: sizing the wire treated in step S7 in a single roll, controlling tension 0.8 g-8.0 g, and sizing in a single roll of 500 or 1000.

2. The method for manufacturing an insulated spherical weld gold wire for integrated circuit double-layer stacked package according to claim 1, wherein in step S1, the gold-cobalt alloy sheet is prepared by: placing 0.1%-0.5% cobalt and 99.9%-99.5% gold by weight percentage into a high-purity graphite crucible, respectively, and placing same in a vacuum alloy furnace, vacuumizing and heating same to 1100° C.-1300° C.; after the material is completely melted, filling high-purity argon as protection, preserving the temperature for 30 min-90 min, and pouring the alloy melt into a graphite mold to obtain a gold-cobalt alloy ingot; and rolling the alloy ingot into a sheet having a thickness of 0.2 mm to 0.5 mm in several passes to obtain a gold-cobalt alloy sheet.

3. The method for manufacturing an insulated spherical weld gold wire for integrated circuit double-layer stacked package according to claim 2, wherein in step S1, the gold-lanthanum alloy sheet is prepared by: placing 0.1%-0.5% lanthanum and 99.9%-99.5% gold by weight percentage into a high-purity graphite crucible, respectively, and placing same in a vacuum alloy furnace, vacuumizing and heating same to 1100° C.-1300° C.; after the material is completely melted, filling high-purity argon as protection, preserving the temperature for 30 min-90 min, and pouring the alloy melt into a graphite mold to obtain a gold-lanthanum alloy ingot; and rolling the alloy ingot into a sheet having a thickness of 0.2 mm to 0.5 mm in several passes.

4. The method for manufacturing an insulated spherical weld gold wire for integrated circuit double-layer stacked package according to claim 3, wherein in step S1, the gold-cerium alloy sheet is prepared by: placing 0.1%-0.5% cerium and 99.9%-99.5% gold by weight percentage into a high-purity graphite crucible, respectively, and placing same in a vacuum alloy furnace, vacuumizing and heating same to 1100° C.-1300° C.; after the material is completely melted, filling high-purity argon as protection, preserving the temperature for 30 min-90 min, and pouring the alloy melt into a graphite mold to obtain a gold-cerium alloy ingot; and rolling the alloy ingot into a sheet having a thickness of 0.2 mm to 0.5 mm in several passes.

5. The method for manufacturing an insulated spherical weld gold wire for integrated circuit double-layer stacked package according to claim 1, wherein in step S1, the gold-germanium alloy sheet is prepared by: placing 0.1%-0.5% germanium and 99.9%-99.5% gold by weight percentage into a high-purity graphite crucible, respectively, and placing same in a vacuum alloy furnace, vacuumizing and heating same to 1100° C.-1300° C.; after the material is completely melted, filling high-purity argon as protection, preserving the temperature for 30 min-90 min, and pouring the alloy melt into a graphite mold to obtain a gold-germanium alloy ingot; and rolling the alloy ingot into a sheet having a thickness of 0.2 mm to 0.5 mm in several passes.

6. The method for manufacturing an insulated spherical weld gold wire for integrated circuit double-layer stacked package according to claim 1, wherein in step S2, the gold-cobalt-lanthanum-cerium-germanium gold alloy rod is prepared by: placing the gold ingot with a purity of ≥99.99% and the gold-cobalt alloy sheet, the gold-lanthanum alloy sheet, the gold-cerium alloy sheet and the gold-germanium alloy sheet prepared in step S1 in a high-purity graphite crucible by weight percentage, placing same in a vacuum pull-down continuous casting furnace, vacuumizing and heating same to 1100° C.-1350° C., preserving the temperature for 15 min-60 min after the materials are completely melted, and performing electromagnetic stirring; refining same for 10 min-60 min after stirring, and obtaining a gold rod with the diameter of φ8 mm through pull-down continuous casting using a directional solidification method with a traction speed being controlled at 50 mm/min-120 mm/min.

7. The method for manufacturing an insulated spherical weld gold wire for integrated circuit double-layer stacked package according to claim 6, wherein in step S2, the gold-cobalt-lanthanum-cerium gold alloy rod is composed of, by weight 0.0001%-1.5% of cobalt, 0.0005%-0.001% of lanthanum, 0.0005%-0.001% of cerium, and balance of gold.

8. The method for manufacturing an insulated spherical weld gold wire for integrated circuit double-layer stacked package according to claim 1, wherein the purity of cobalt, lanthanum, cerium, and germanium is ≥99.99%, and the purity of gold is ≥99.999%.

9. The method for manufacturing an insulated spherical weld gold wire for integrated circuit double-layer stacked package according to claim 1, wherein the density of graphite is ≥1.65 g/cm$^3$ and the density of ash is ≤100 ppm in high-purity graphite crucible and graphite mold.

10. The method for manufacturing an insulated spherical weld gold wire for integrated circuit double-layer stacked package according to claim 9, wherein in step S6, the protective coating has a thickness of 0.3 nm to 1 nm.

* * * * *